US008447445B2

(12) United States Patent
Onu et al.

(10) Patent No.: US 8,447,445 B2
(45) Date of Patent: *May 21, 2013

(54) DYNAMIC ADJUSTMENT OF WING SURFACES FOR VARIABLE CAMBER

(75) Inventors: Dan Onu, Redmond, WA (US); John D. Winter, Seattle, WA (US); Candy L. Carr, Everett, WA (US); Paul M. Vijgen, Everett, WA (US); Gary A. Emch, Marysville, WA (US); Michael E. Renzelmann, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 837 days.

This patent is subject to a terminal disclaimer.

(21) Appl. No.: 12/620,698

(22) Filed: Nov. 18, 2009

(65) Prior Publication Data
US 2010/0152926 A1 Jun. 17, 2010

Related U.S. Application Data

(62) Division of application No. 11/734,842, filed on Apr. 13, 2007, now Pat. No. 7,641,152.

(51) Int. Cl.
*B64C 13/00* (2006.01)
(52) U.S. Cl.
USPC ............................................. 701/11; 244/201
(58) Field of Classification Search ................... 701/11; 244/194, 195, 175, 178, 180, 181, 219, 198, 244/75.1, 35 R, 201, 213–215, 217, 99.4
See application file for complete search history.

(56) References Cited

U.S. PATENT DOCUMENTS

| 4,247,066 | A | * | 1/1981 | Frost et al. ..................... 244/219 |
| 4,687,162 | A | * | 8/1987 | Johnson et al. ................ 244/213 |
| 4,899,284 | A | | 2/1990 | Lewis et al. |
| 5,740,991 | A | | 4/1998 | Gleine et al. |
| 5,875,998 | A | | 3/1999 | Gleine et al. |
| 5,908,176 | A | | 6/1999 | Gilyard |
| 6,161,801 | A | | 12/2000 | Kelm et al. |
| 6,598,834 | B2 | | 7/2003 | Nettle et al. |
| 2003/0090256 | A1 | | 5/2003 | Kircher |
| 2005/0116108 | A1 | * | 6/2005 | Morgenstern et al. ........ 244/130 |
| 2006/0049308 | A1 | | 3/2006 | Good et al. |

FOREIGN PATENT DOCUMENTS
GB 2096551 10/1982

* cited by examiner

*Primary Examiner* — Dalena Tran
(74) *Attorney, Agent, or Firm* — Ostrager Chong Flaherty & Broitman P.C.

(57) ABSTRACT

The movable surfaces affecting the camber of a wing are dynamically adjusted to optimize wing camber for optimum lift/drag ratios under changing conditions during a given flight phase. In a preferred embodiment, an add-on dynamic adjustment control module provides command signals for optimum positioning of trailing edge movable surfaces, i.e., inboard flaps, outboard flaps, ailerons, and flaperons, which are used in place of the predetermined positions of the standard flight control system. The dynamic adjustment control module utilizes inputs of changing aircraft conditions such as altitude, Mach number, weight, center of gravity (CG), vertical speed and flight phase. The dynamic adjustment control module's commands for repositioning the movable surfaces of the wing are transmitted through the standard flight control system to actuators for moving the flight control surfaces.

19 Claims, 20 Drawing Sheets

IDEAL POSITION VARIATION & COMMANDED POSITIONS

INTEGRATION WITH STANDARD AIRPLANE CAMBER CONTROL

IDEAL POSITION VARIATION & COMMANDED POSITIONS

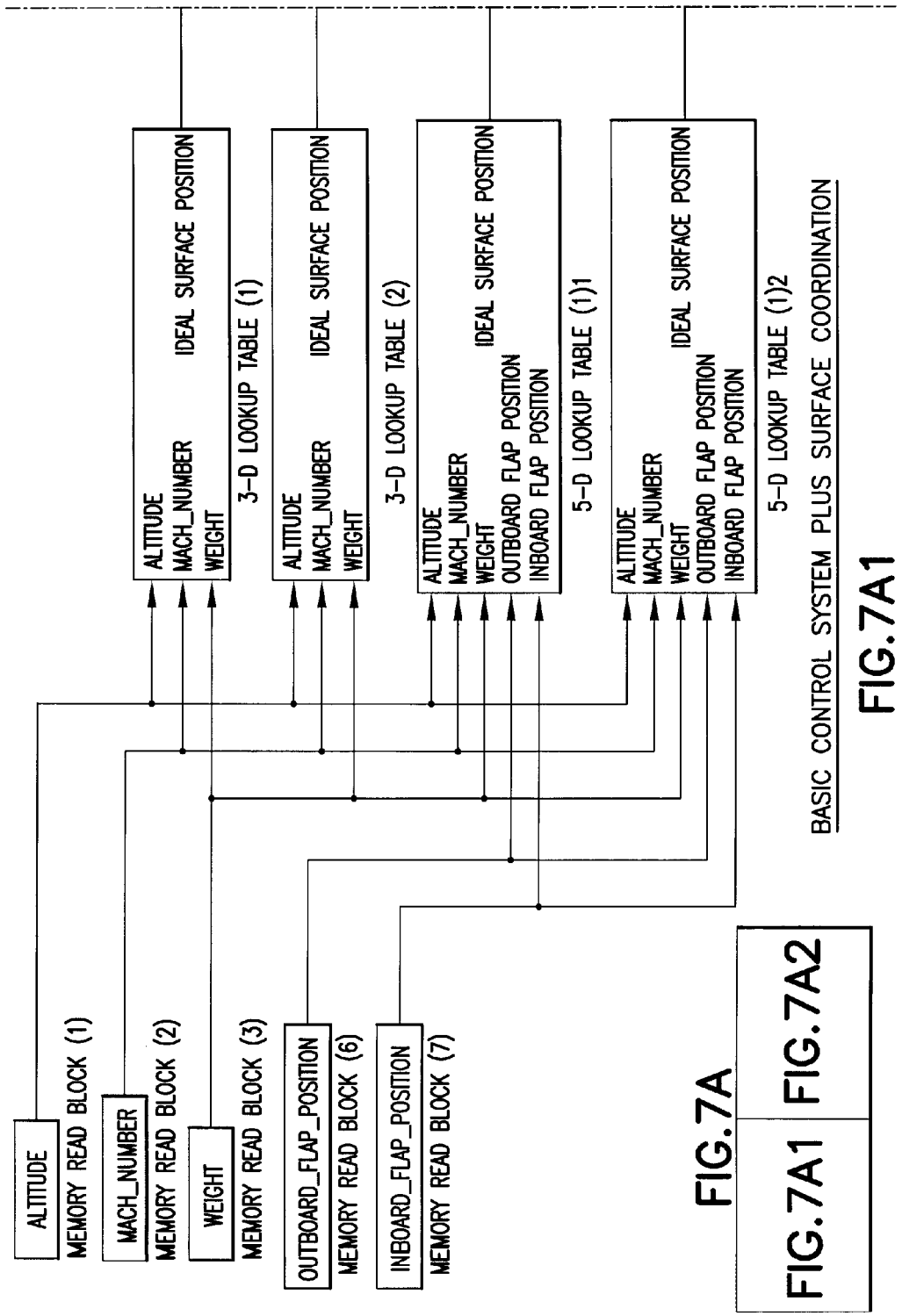

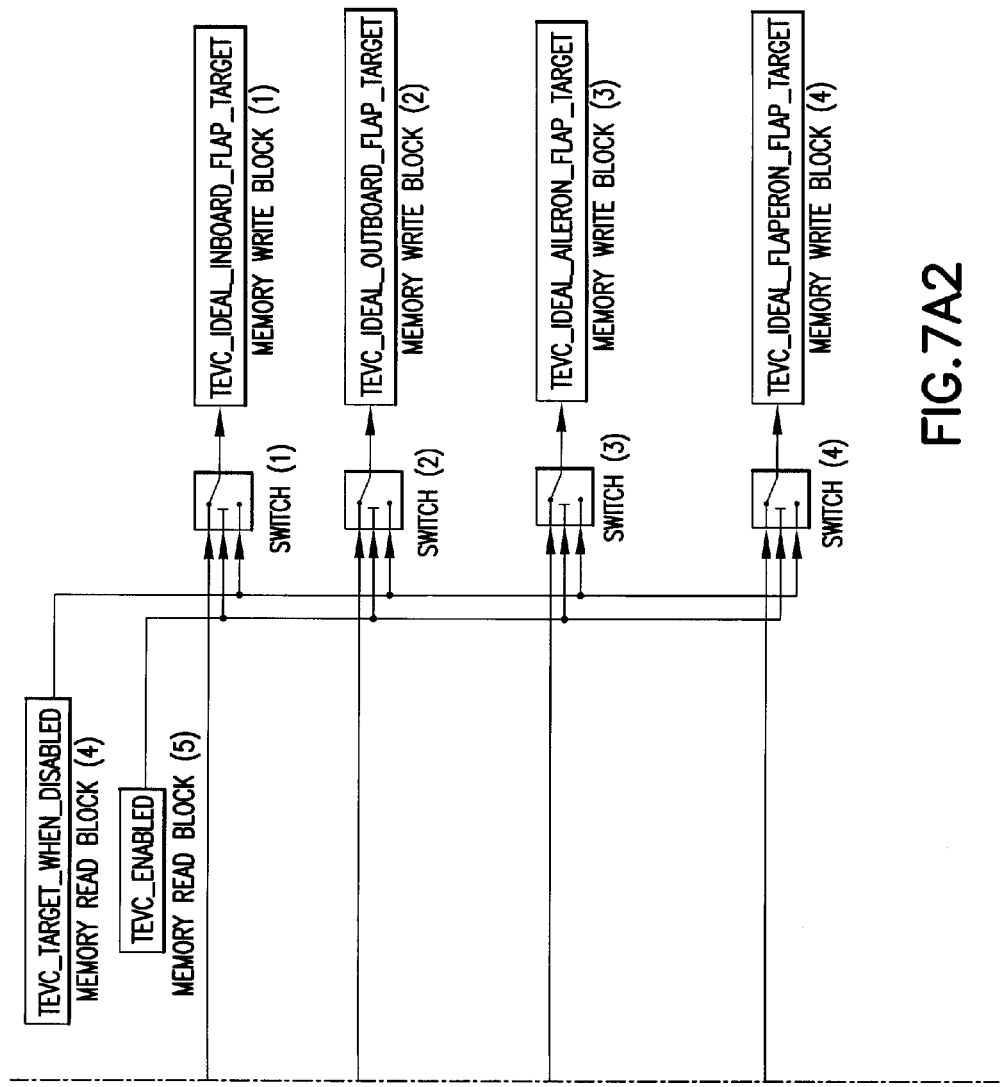
FIG.7A2

BASIC SYSTEM PLUS TARGET PREDICTION

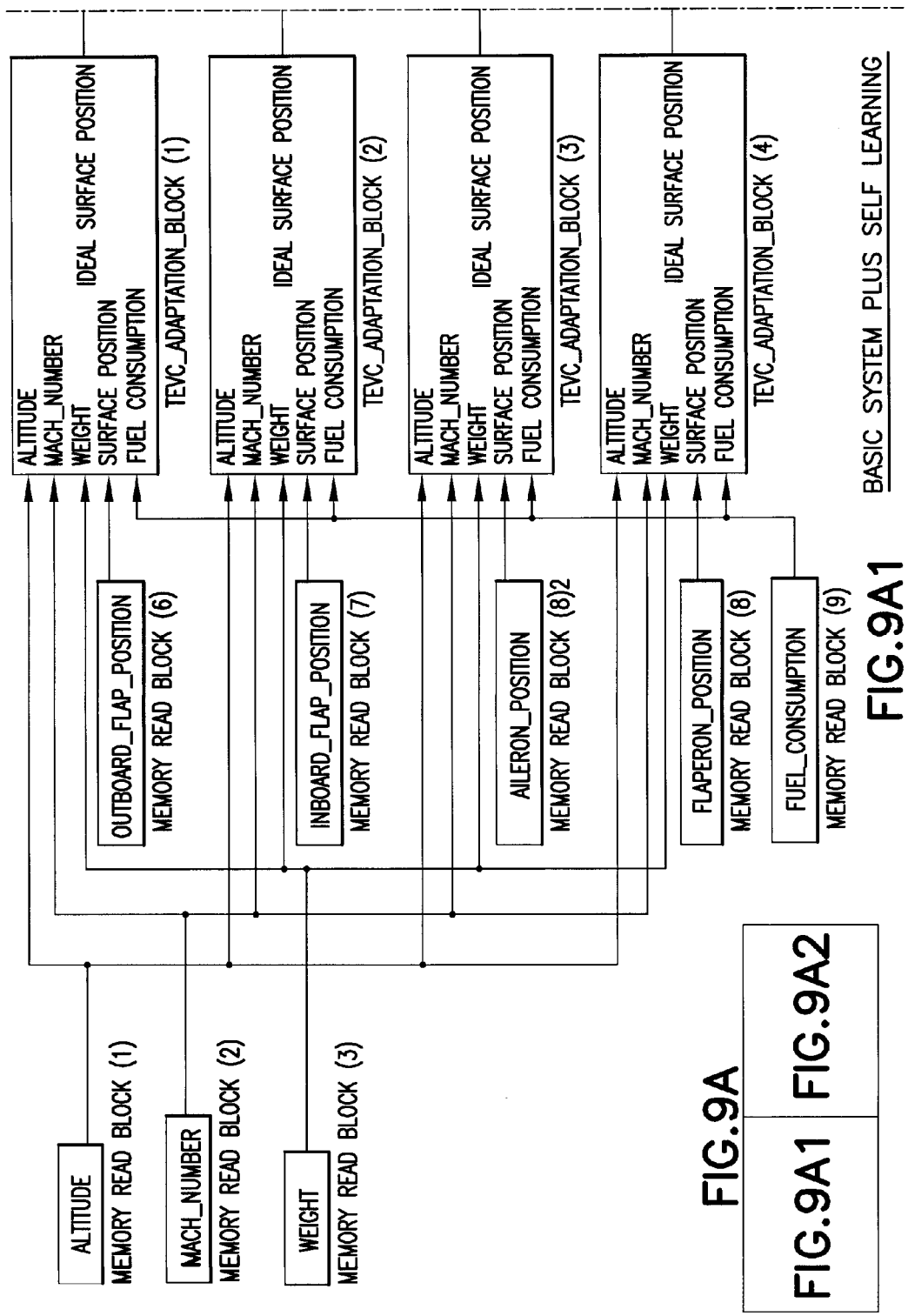

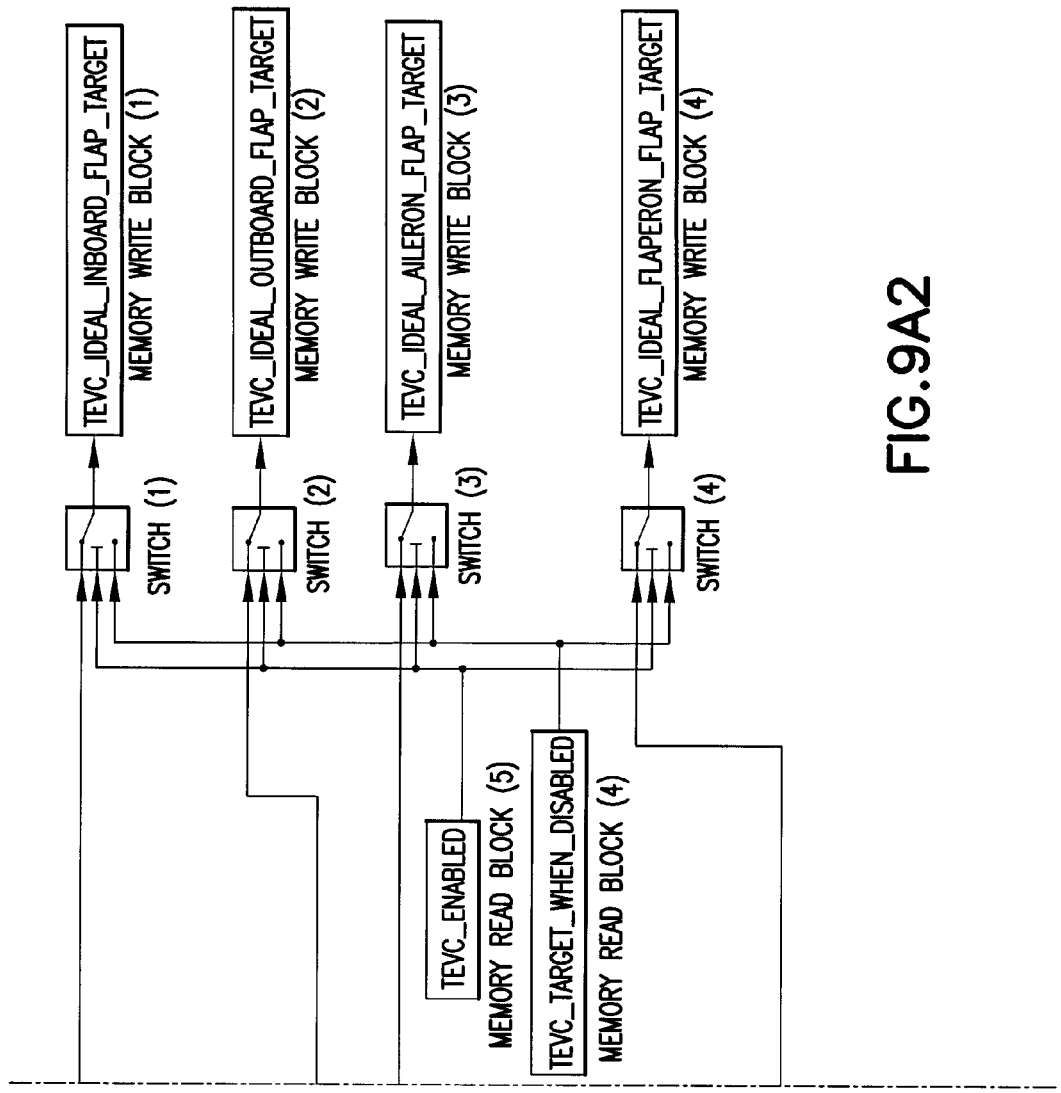
FIG.9A2

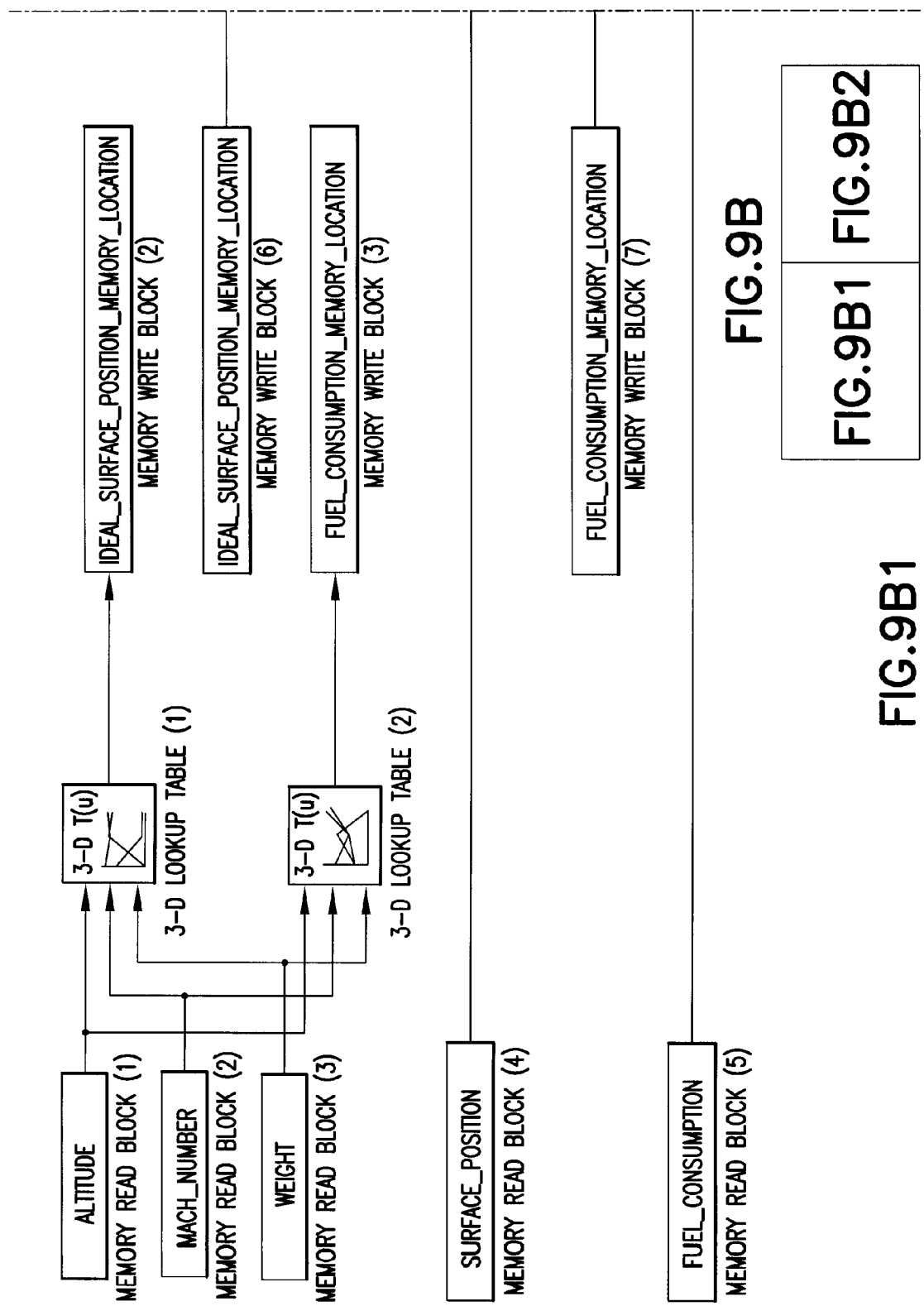

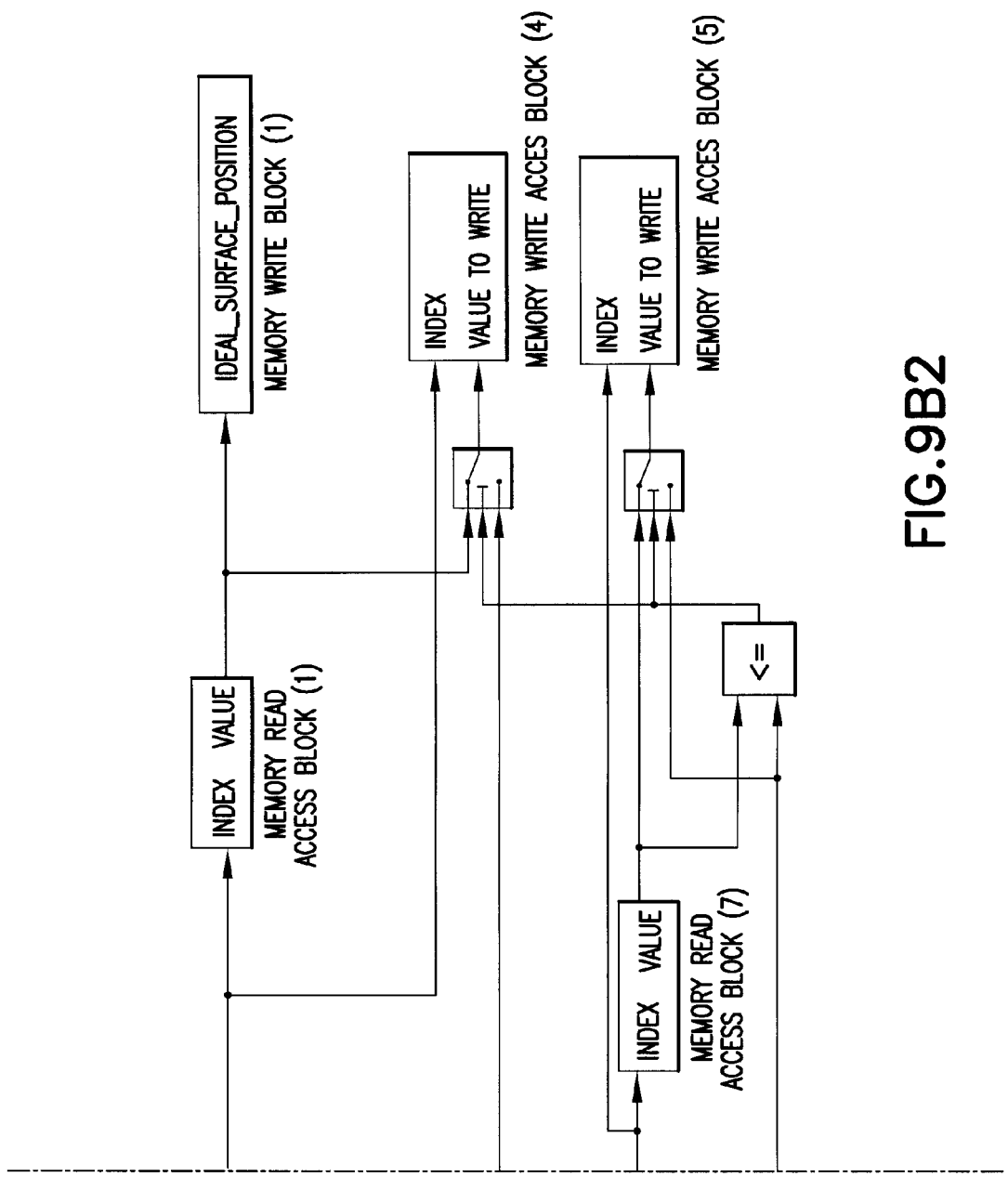
FIG.9B2

DYNAMIC ADJUSTMENT OF WING SURFACES FOR VARIABLE CAMBER

CROSS-REFERENCE TO RELATED APPLICATION

The present application is a divisional of U.S. application Ser. No. 11/734,842, filed Apr. 13, 2007, which is incorporated herein by reference.

TECHNICAL FIELD

The invention described herein relates to a system for an optimized cruising control for aircraft, and particularly to aircraft flight control system which dynamically adjusts a wing's movable surfaces for variable camber.

BACKGROUND OF INVENTION

The aircraft wing for commercial airplanes is designed such that the lift/drag (L/D) ratio is optimized for such conditions as cruising at particular speeds and altitudes. Operating at slightly different conditions from the optimum can mean increased fuel consumption. For military aircraft, optimizing L/D for (short) maneuvers could be more important than steady state L/D characteristics. U.S. Pat. No. 4,899,284 issued in 1990 to Lewis et al., entitled "Wing Lift/Drag Optimization System", has provided for varying the wing camber such that L/D is optimized in flight but has focused on enhancement of the airplane L/D parameter for maneuvers. Other systems for wing camber control include U.S. Pat. No. 6,161,801 issued to Kelm et al., and U.S. Pat. Nos. 5,875,998 and 5,740,991 issued to Gleine et al.

Aircraft and wing performance are greatly affected by the airfoil (cross section) of the wing, one property of which is the mean camber line. Conventional flap extension for landing produces vast changes in an airfoil's mean camber line and therefore in its lift and drag characteristics. Small changes to an airfoil's camber have the same effect, just on a smaller scale. Additionally, span-wise variation of camber along the span of the wing allows induced and wave drag reduction. This is achieved by differential deflection of inboard and outboard flaps by changing wing span-wise loading. In the prior art, adjustment of an airplane wing's Leading Edge (LE) and Trailing Edge (TE) configuration is most usually limited for non-cruising flight segments. For example, flaps are historically used for take off and landing only, and remain stored in a single configuration for the rest of the flight. In general, prior systems have provided for varying the wing camber for optimization with respect to different stages or phases of flight.

SUMMARY OF THE INVENTION

Embodiments of the present invention provide for dynamically adjusting the movable surfaces of a wing so as to optimize the wing camber for changing conditions during a given flight phase. For example, in a cruise flight phase of a commercial airplane, a system of one embodiment of the present invention enables dynamic adjustment by differential deflections to continually maximize the lift/drag ratio of the typical wing trailing edge movable surfaces, i.e. inboard flaps, outboard flaps, ailerons, and flaperons. In a preferred embodiment, the invention is configured as an add-on dynamic adjustment control module to the standard flight control system. The standard system operates conventional flight control rules ("laws") for existing airplane configurations, including the use of sensors for determining various flight conditions and aircraft parameters, on-board computers running the control laws software, and actuator systems for moving the controlled surfaces. The dynamic adjustment control module computes optimum commands for the commanded surfaces based on dynamically changing aircraft parameters and flight conditions such as altitude, Mach number, weight, center of gravity (CG), vertical speed and flight phase state (e.g., cruise state). The dynamic adjustment commands for the controlled trailing edge surfaces are transmitted through the actuation system of the standard flight control system to actuators for moving the flight control surfaces.

In a preferred implementation, the dynamic adjustment control module detects aircraft cruise conditions, and commands actuation of the optimum controlled surfaces to target positions for optimizing L/D ratios in such conditions. The control laws for actuating the commanded surfaces factor in the expected flight conditions over a period of time, since commanding changes that are not going to be maintained over an adequate duration is costly and increases the design burden on the actuation equipment based on fatigue and maintenance considerations. The calculated and dynamically controlled repositioning of some or all of the wing's trailing edge surfaces in the cruise state results in continual optimization of the lift-to-drag ratios for the wing. The more aerodynamically efficient wing camber adjustments can reap a benefit of as much as 2-5% reduction of airplane drag. Additional potential benefits include increased buffet margin and high lift span-load tuning for drag or wake-vortex roll-up control. The trailing-edge repositioning is automatic, so it requires no added pilot or ground crew work. It also facilitates the further development of adaptive wing control systems that can learn optimum control surfaces repositioning over time.

Other features and advantages of the present invention will be explained in the following detailed description of embodiments of the invention having reference to the following drawings.

BRIEF DESCRIPTION OF DRAWINGS

FIG. 7A is a schematic diagram showing a front end of a Used Surface Target function for a version of the trailing edge variable camber control system with controlled surface coordination.

FIG. 9A is a schematic diagram showing a basic trailing edge variable camber control system with self learning capability, and FIG. 9B shows its Adaptation function.

DETAILED DESCRIPTION OF THE INVENTION

In the following description, a basic implementation of the invention is described to show an exemplary embodiment of a system for dynamic adjustment of wing trailing edge for variable camber. The system is configured as an add-on dynamic adjustment control module to the standard control system and control laws used in existing airplane flight control systems, for example, as described in commonly-owned U.S. patent application Ser. No. 10/935,846, filed on Sep. 8, 2004, entitled "Systems and Methods for Providing Differential Motion to Wing High Lift Devices", published as U.S. Published Patent Application 2006/0049308 A1, which is incorporated by reference herein. Such existing airplane flight control systems are deemed to be well-known to those skilled in this field, and are not described in further detail herein. The exemplary embodiment described herein is referred to herein as the "Trailing Edge Variable Camber" (TEVC) system.

Figure 1:
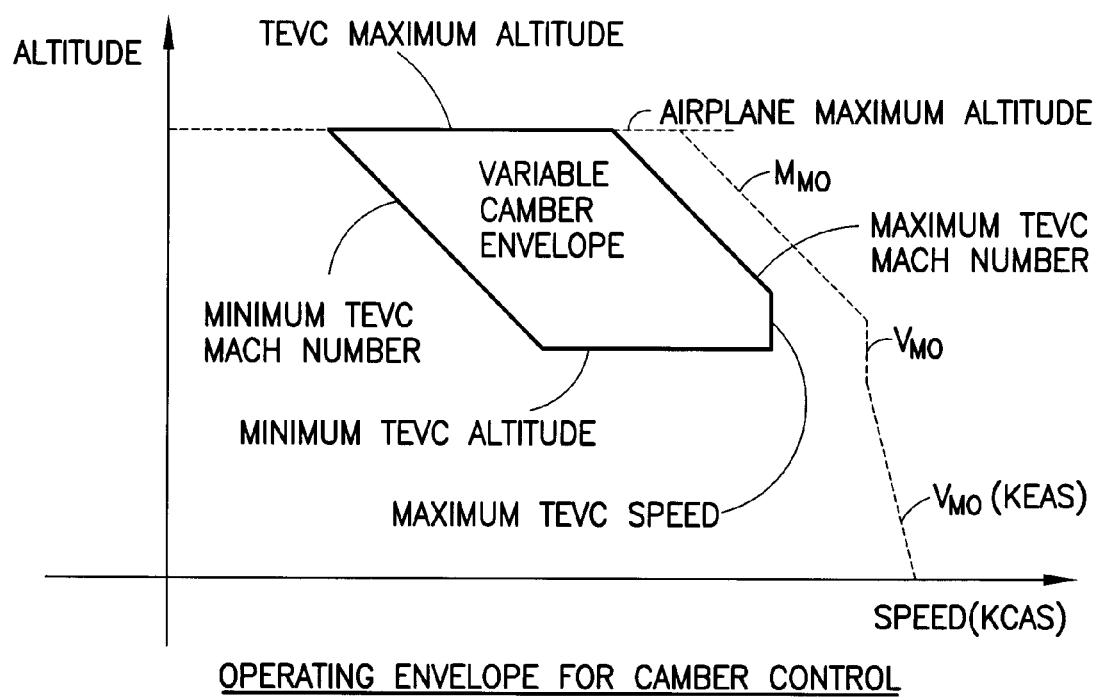
FIG. 1 is a graph showing a typical airplane flight operating envelope within maximum altitude and speeds (MMO and VMO) boundaries and the target flight operating envelope for dynamic adjustment of variable wing camber in accordance with embodiments of the invention.

Referring to FIG. 1, the Trailing Edge Variable Camber (TEVC) system is intended to operate within the optimum Variable Camber Envelope defined by optimum boundary parameters. The TEVC Maximum Altitude boundary of the optimum Variable Camber Envelope is set near the Airplane Maximum Altitude design parameter. The minimum altitude boundary of the optimum Variable Camber Envelope is defined as the Minimum TEVC Altitude. The maximum speed boundaries within which the TEVC operates are defined as the Maximum TEVC Mach Number and the Maximum TEVC Speed, which are selected to be less than the maximum mach and speed (MMO and VMO) parameters for the aircraft. The minimum speed boundary within which the TEVC operates is defined as the Minimum TEVC Mach Number.

Figure 2:
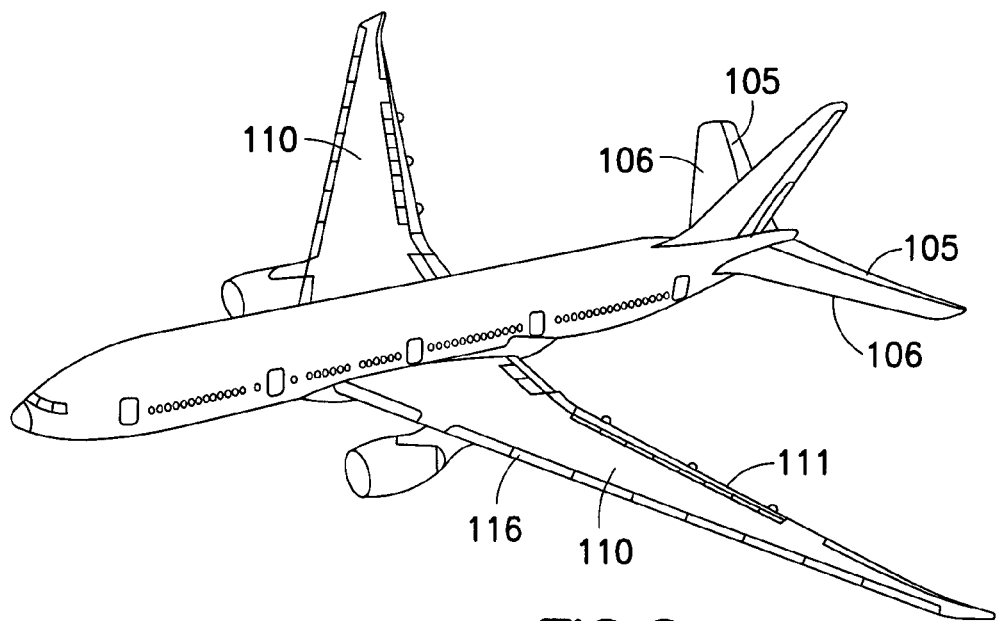
FIG. 2 is a schematic diagram showing an overall view of typical airplane controllable camber surfaces.

Referring to FIG. 2, an overall view of a typical commercial airliner shows its controllable camber surfaces including wing 110, wing trailing-edge devices 111, wing leading-edge devices 116, horizontal tail 106 and tail elevators 105. Camber characteristics of some or all of these controlled surfaces can be dynamically adjusted in the present invention to optimize L/D ratio during cruise or other flight segments.

Figure 3:
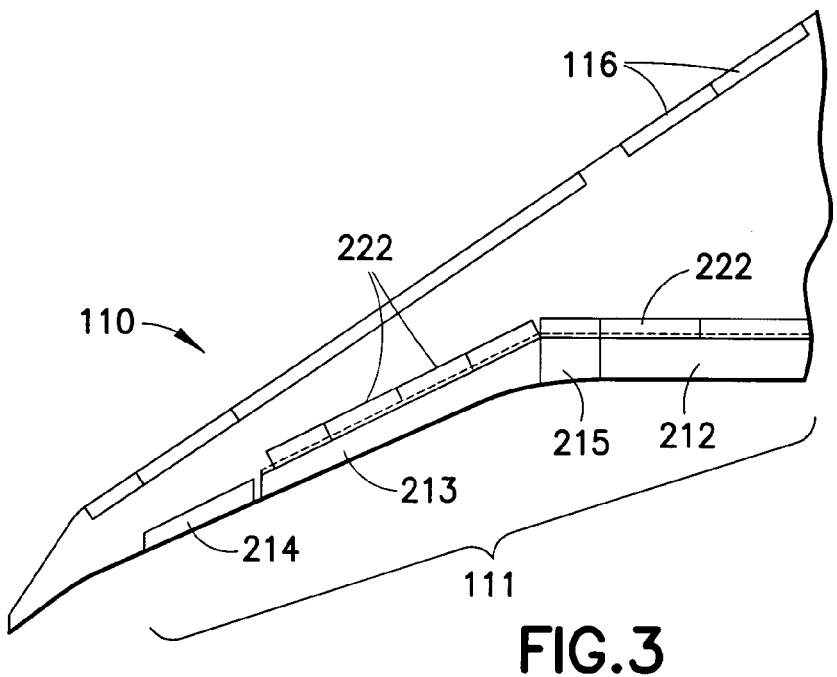
FIG. 3 is a schematic diagram showing a detailed view of wing controllable camber surfaces on wing and empennage.

Referring to FIG. 3, a detailed view shows typical wing camber surfaces including wing 110, wing trailing-edge devices 111, and wing leading-edge devices 116. In particular, the wing trailing-edge devices 111 include inboard trailing-edge flap 212, inboard roll-control flap device 215, outboard trailing-edge flap 213, outboard roll-control flap device 214, and spoilers 222. Camber characteristics of some or all of these controlled surfaces can be dynamically adjusted in the present invention to maintain optimum L/D ratio during cruise or other flight segments.

Figure 4:
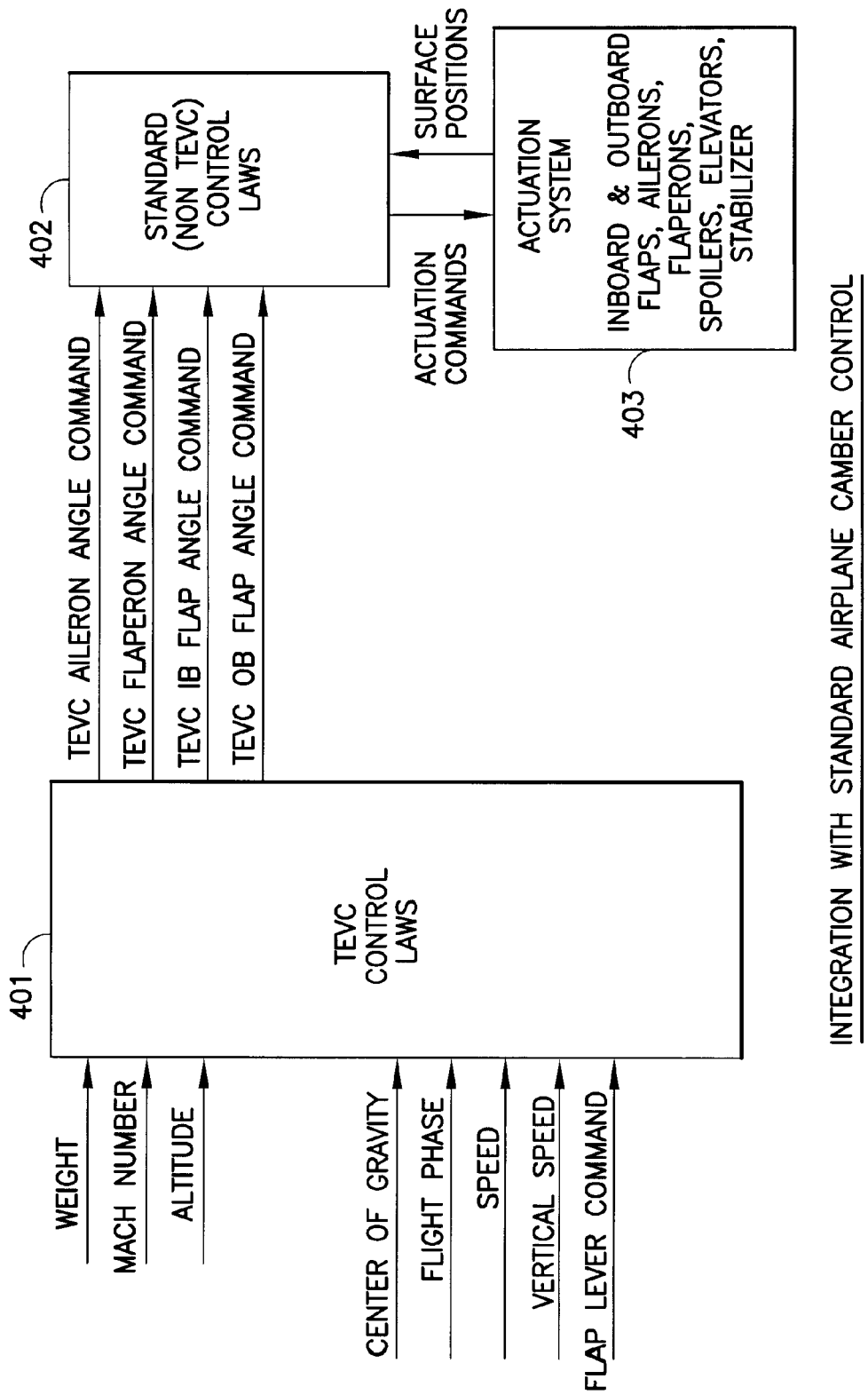
FIG. 4 is a schematic diagram showing integration of a dynamic adjustment control module for variable wing camber with a standard airplane variable camber control system.

Referring to FIG. 4, the Trailing Edge Variable Camber (TEVC) system has a TEVC control module 401 which receives sensor or control inputs, including airplane weight, Mach number, altitude, center-of-gravity, flight phase, speed, vertical speed, flap lever command, and other selected flight parameters (not shown here) and implements its dynamic adjustment control laws to derive the dynamic adjustment optimization parameters for the controlled surfaces angles, including at least TEVC Aileron Angle, TEVC Flaperon Angle, TEVC Inboard Flap Angle, and TEVC Outboard Flap Angle. The derived dynamic adjustment optimization parameters are transmitted to the Standard Flight Control System 402 for the aircraft, which implements its standard control laws to send out servo actuation commands to the Actuation System 403 for carrying out the determined control movements for the controlled surfaces of the aircraft.

Figure 5:
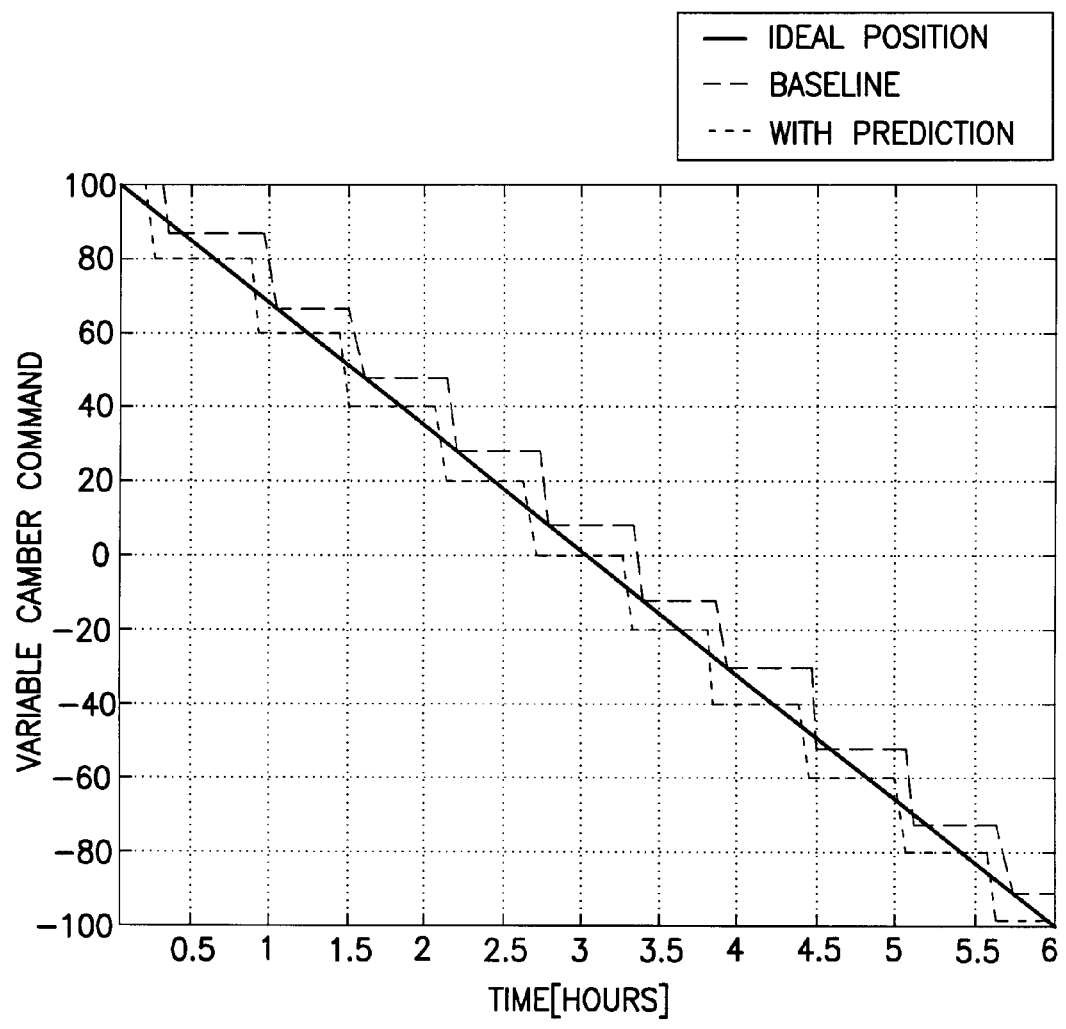
FIG. 5 is a schematic diagram showing ideal, baseline, and baseline-with-prediction positioning of wing camber surfaces for percent of surfaces commanded and time duration of cruise flight stage.

Referring to FIG. 5, the ideal, baseline, and baseline-with-prediction positioning of wing camber surfaces are illustrated for percent of surfaces commanded and time duration of cruise flight stage. The baseline positioning (shown in dashed line) consists of a series of adjustments the camber-controlled surfaces to approach optimum L/D ratio at selected points in time, e.g., at half-hour intervals, to command the camber-controlled surfaces to approach the optimum L/D ratios. In hypothetical, the amount of controlled surfaces needing to be adjusted decreases with the duration of the controlled flight stage as it approaches its stable flight optimum. For a TEVC system with capability to predict ahead the positioning of the camber-controlled surfaces to approach optimum L/D ratio, the baseline-with-prediction positioning (shown in dashed line) consists of a series of adjustments interleaved with the optimum L/D ratios at selected points in time. The ideal positioning (shown in solid line) is shown as a smooth line of continuous infinitesimal adjustments to maximize attaining the optimum lift-to-drag ratios on an ongoing basis.

The means by which the drag and/or lift are improved is by varying the camber of the wing through ongoing modification of the airfoil (cross-section) of the wing as well as the spanwise camber distribution at a given lift condition. The TE variable camber changes are obtained by directly commanding to aircraft parameter driven targets the following TE wing surfaces:

The inboard flaps
The outboard flaps
The ailerons
The flaperons

Based on transitory and the final flap position during TEVC-controlled flight, the following surfaces may be commanded also such that airplane drag and lift are optimized:
The spoilers corresponding to the inboard flaps
The spoilers corresponding to the outboard flaps.

Indirectly, as a result of the flaps, spoilers, ailerons and flaperons moving or changing position, in order to maintain pilot or autopilot controlled aircraft parameters such as altitude and Mach number, the thrust of the airplane engines may decrease while several other aircraft surfaces are commanded to new positions to trim the airplane:

The elevators
The stabilizer

A way to intuitively describe the sequence of events in getting the TEVC benefit can be formulated if the objective is chosen to maintain the lift of the airplane for the same altitude and Mach number, but reduce drag and thus reduce engines thrust and fuel consumption. Before and after TE surface repositioning, in unaccelerated level flight, the lift has to equal weight, and the thrust needs to equal drag. The TEVC module commands the repositioning of the flaps, ailerons and flaperons. The position of the spoilers mainly changes based on the position of the flaps. In order to maintain airplane lift after changing the TE relative geometry at given altitude and Mach number, the Angle of Attack (AOA) needs to change, and this is achieved by (auto) pilot commanding the elevators and stabilizer to new positions. The new airplane configuration, with new flaps, spoilers, ailerons, flaperons, elevator, stabilizer, and AOA position values, can achieve the same lift with lower drag. As a result, the thrust is adjusted down and settles to a lower value compared to the pre-TEVC surface positioning once the airplane re-enters altitude and Mach number steady state after the TE camber variation. The lower thrust in turn reduces fuel consumption, which translates in fuel savings or/and increased range.

Example Implementation of TEVC Control System

The particular approach to variable camber control for any aircraft is determined by the desired flying qualities of the airplane. The control system of the airplane is comprised of both the control laws and the actuation system, where the later is the means to achieve the control law computed deflection for the controlled surfaces. The general variable camber control approach for implementing a baseline TEVC function follows these two high level concepts: (1) keep hardware and software changes to a minimum compared to an airplane baseline with no TEVC control designed in; and (2) provide a high lift flaps actuation system that allows for positioning of the Outboard (OB) flaps at different positions compared to the Inboard (IB) flaps. As a result, the design implementation for the purpose of accommodating TEVC control in the baseline is developed with certain operational characteristics. The TE flaps actuation system has a TEVC control unit on each wing that allows for the OB flap torque tube driven actuation to be disconnected from the similar IB flap actuation. This enables the IB flaps to be moved while the OB flaps are kept at the same position. Also, the TEVC control laws for the flaps leverage the electric flaps actuation system, including the position sensors used by both primary and secondary modes.

In implementing the TEVC control function, advantage was taken of the capability provided to modern airplanes by an integrated digital flight control system that integrates into one control module functionality of different flight control functions, i.e., high lift, primary flight, and auto-flight functions. This greatly facilitates the coordinated control of the TEVC commanded surfaces, as those controlled surfaces are part of either the high lift or the primary flight function. The particular implementation focused on the objective of reducing the drag while maintaining the same lift when comparing the aircraft parameters just before and after a TEVC commanded surfaces' position change. This is beneficial especially for the cruise segments of the flight, where a common procedure is to maintain altitude and Mach number for long periods of time relative to the total mission time. Since weight is almost the same shortly before and after repositioning the TEVC controlled surfaces at cruise, if Mach number and altitude are kept to the same level before and after the change then the lift has to be constant before and after the change. Therefore, in this particular implementation, the ideal TEVC surface positions for the TEVC directly controlled surfaces are made dependent on at least three factors: Altitude; Mach number; and Weight.

Further, the general approach of this implementation of the TEVC control laws is to determine the time when the airplane is in the cruise flight phase, and command and position the IB flaps, OB flaps, aileron and flaperons to (different) predetermined position targets depending on the altitude, Mach number and weight. As a note, the IB and the OB flaps may have different or similar targets. Reliance was also placed on the standard (non TEVC) control laws to control the spoilers, elevators and stabilizer to new positions such that the altitude is maintained constant, and thus preserving the lift by adjusting the AOA, and on the (auto) pilot to adjust the throttle, and thus engine fuel consumption to trim the airplane. The ideal position targets for the flaps, ailerons and flaperons are determined from analysis and experiment, including flight at different altitudes, Mach numbers and weights.

Referring again to FIG. 4, the TEVC control laws are implemented as a layer on top of the standard control laws. The TEVC control laws are responsible for enabling the TEVC function and computing the commands for the inboard flaps, outboard flaps, ailerons and flaperons. The TEVC computed commands are achieved by means of the standard control laws, which is to say control laws implementations similar to an airplane with no TEVC function. The flaps commands are relative position commands with respect to the wing structure, and they are different commands for IB versus OB flaps, but symmetric left to right wing. The aileron and flaperon commands are also relative position commands with respect to the wing structure, also symmetric left to right wing, but superposition of (asymmetric) commands necessary for aircraft controllability is allowed as additive on top of the TEVC commands.

The targets for each of the TEVC directly controlled surfaces (IB and OB flaps, aileron and flaperons) are based on airplane parameters, i.e., a look-up table with the altitude, Mach number, and weight as inputs. For implementation efficiency purpose, the weight is converted into a coefficient of lift, and used to search in a table which has the weight replaced with coefficient of lift entries. The TEVC function is enabled based on altitude, speed, and Mach number and the airplane being in a stable cruise phase. The TEVC function also looks at inputs with respect to weight and center of gravity, vertical speed, flaps position, and pilot selection of target altitude by means of the Mode Control Panel (MCP).

A process description of the baseline TEVC control laws implementation is provided as follows:

1) Continuously evaluate steps 2) to 10)

2) Determine if TEVC function should be enabled based on design thresholds and real-time values for such airplane parameters as: Altitude; Mach number; Weight; Speed; Center of Gravity.

3) Determine if TEVC function should be enabled based on real-time readings from the flight management function indicating a cruise state.

4) Determine if the TEVC function should be enabled based on the flap lever input indicating a flaps up flap lever command As a note, the TEVC function is enabled only for the flaps lever in the Up position, as only small deflection around the stowed configuration for the flaps will make the range of the TEVC control envelope.

5) Determine if the TEVC function should be enabled based on the airplane weight and center of gravity design thresholds, and estimated center of gravity values.

6) Determine if the TEVC function should be enabled based on the state of monitors for primary flight surfaces, ailerons, flaperons and spoilers. As a note, the monitors are basically indicating availability of the surfaces to follow future commands at required position accuracy.

7) If all the enabling criteria mentioned in the conditions 2) to 6) are met then enable the TEVC control.

8) When TEVC is enabled, compute standard control law targets for the IB and OB flaps, ailerons and flaperons based on: Altitude; Mach number; Weight.

9) When TEVC is enabled, if determined, reduce the authority of the TEVC commands based on weight and center of gravity so that wing and surface design load constraints are met.

10) When TEVC is enabled, hold constant TEVC position commands coming out of the TEVC control module if the real-time vertical speed of the aircraft exceeds a design threshold. As a note, this will prevent increased actuation cycles for the controlled surfaces resulting in negative or no airplane fuel benefit as the airplane changes to altitude (and surface position targets) too quickly.

11) Disable TEVC if any of the enabling conditions 2) to 6) is not met anymore, and change the TEVC command for the flaps, ailerons and flaperons to the neutral position corresponding to flaps up lever command for an airplane with no TEVC.

Other possible variations to the TEVC control law design can include the following:

a. Use the center of gravity as an input parameter in the determination of the TEVC commanded surface positions, and not only as an authority factor on the commands computed based on other input parameters, e.g., Altitude, Mach number and Weight.

b. Allow for a self-learning function to be integrated in the TEVC control module for each particular airplane, where the relation of the TEVC targets to the input parameters is being updated based on past TEVC positions and observed criterion to be minimized, e.g., fuel consumption or drag. This could be described as a closed-loop solution on the optimized criterion, as opposed to all the airplanes flying the same TEVC airplane parameter dependent targets, as determined by analysis and experiments on other (flight test) airplanes. This variation is described in more detail below in the section titled "TEVC Implementation with Adaptation (Self-Learning) Function".

c. Take advantage of the ailerons and flaperons actuation budget allowing more frequent motions compared to the flaps, and add a "mini-TEVC" function where the ailerons and flaperons move more often than the flaps, and have the flaps positions as additional input parameters determining the "mini-TEVC" ailerons and flaperons commands Have the stabilizer and elevators controlled to predetermined TEVC commands dependent on airplane conditions, the same as for flaps, ailerons and flaperons, rather than relying on the trimming of the airplane to control their positions. This variation is described in more detail below in the section titled "TEVC Implementation with Surface Coordination".

d. Automatically use the flight plan information, available from the sources such as the Flight Management Function, in determining the optimum timing of commanding to new TEVC targets such that any or all of these improvements are obtained. This variation is described in more detail in the section titled "TEVC Implementation with Prediction Function".

e. Extend the TEVC enable envelope to flight regimes characterized by increased vertical speeds and/or accelerations in the horizontal airplane axis.

Figure 6A:
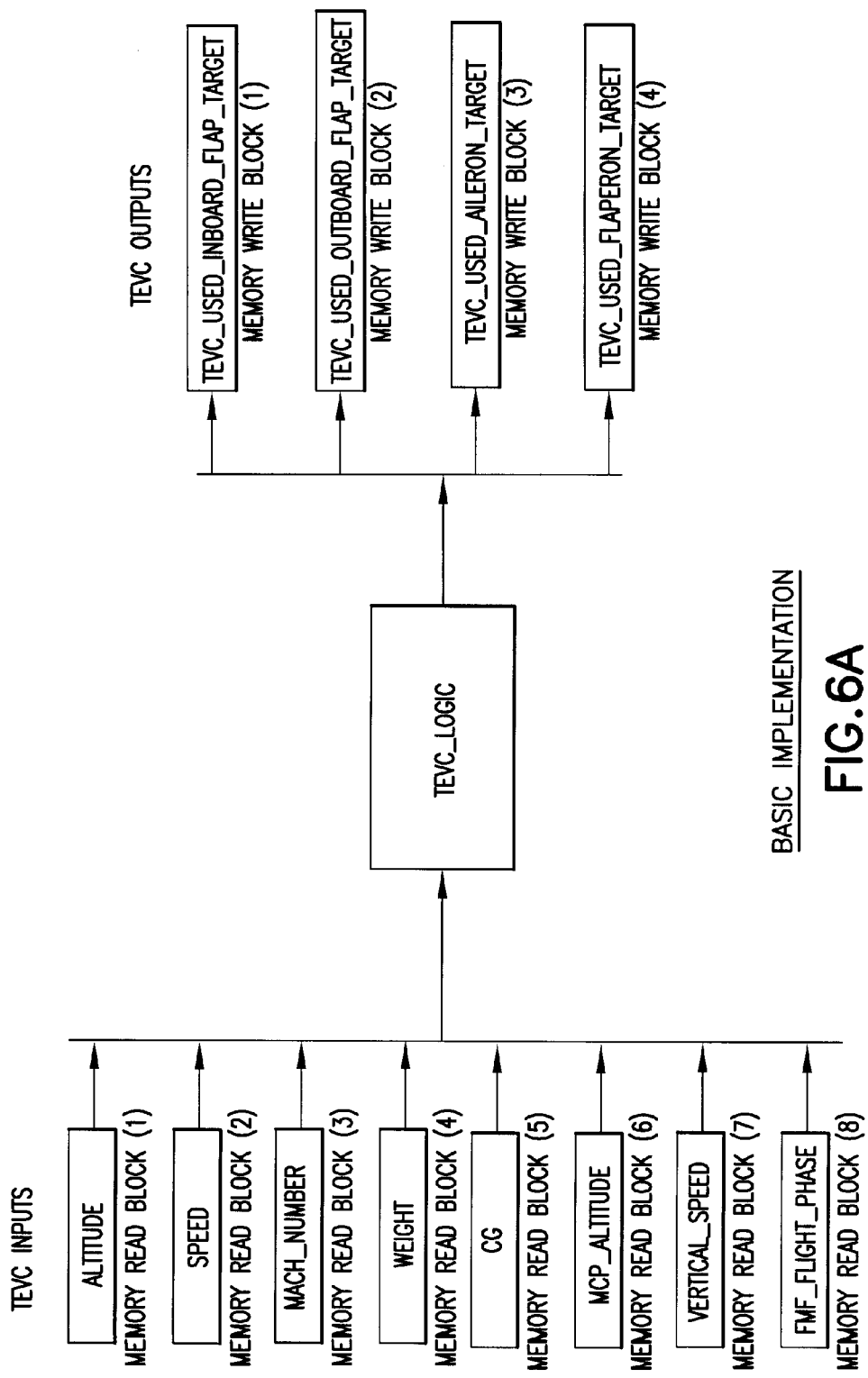
FIG. 6A is a schematic diagram showing an example of basic implementation of a trailing edge variable camber control logic.

The main TEVC control logic and functions for the basic implementation of dynamic adjustment for variable camber will now be described. FIG. 6A shows a high level logic diagram of the TEVC logic for the TEVC control module in FIG. 4. A number of input parameters are shown as numbered memory read blocks, and a number of output parameters are shown as numbered memory write blocks. The block TEVC logic reads and writes these memory locations. The four outputs correspond to the target commanded positions that are implemented by the actuation system.

Figure 6B:
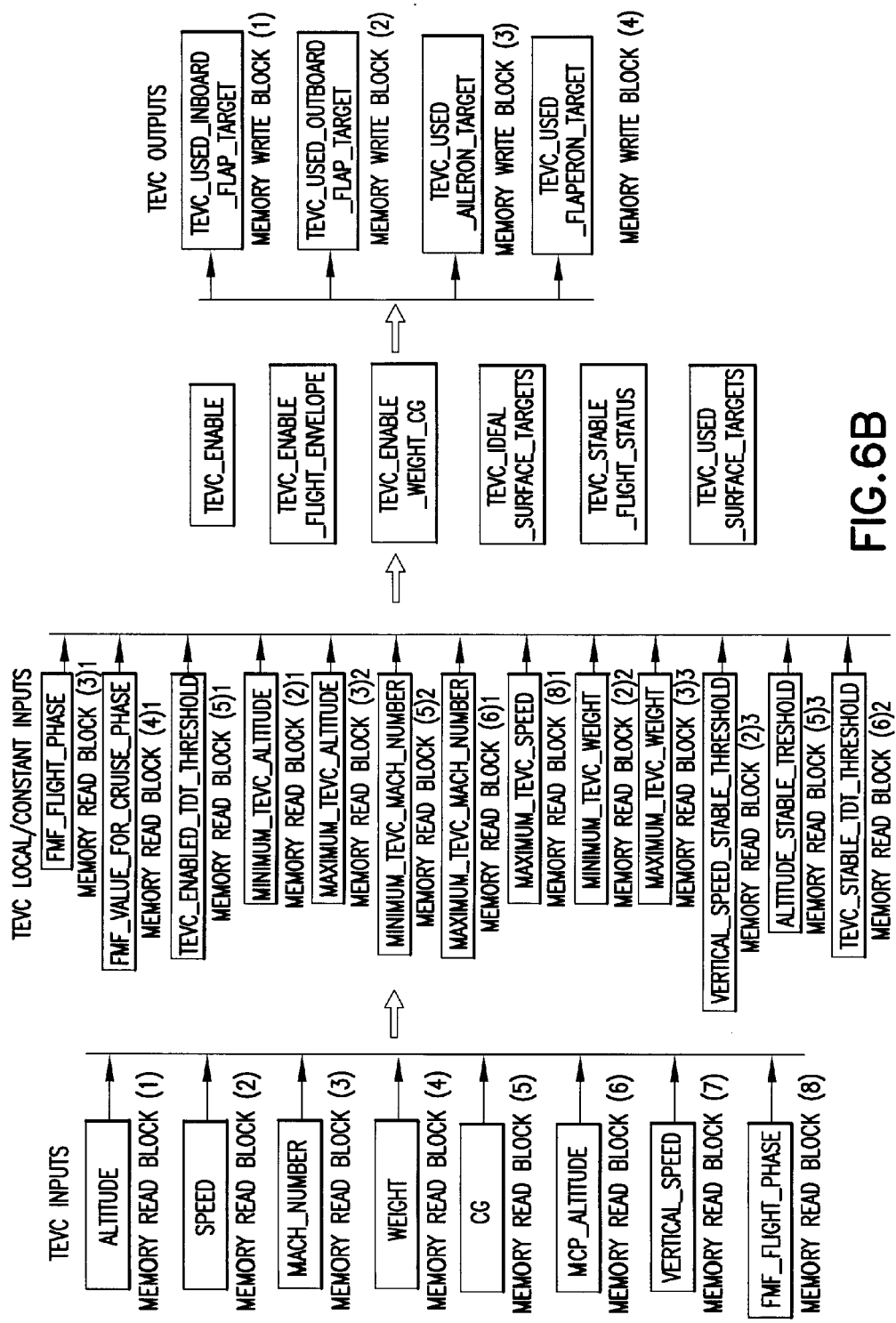
FIG. 6B shows a more detailed view of its example logic functions.

FIG. 6B shows the TEVC_Logic at the next level down handling the aforementioned inputs and outputs. Besides the external TEVC inputs of the airplane's actual flight conditions, other TEVC Local/Constant inputs are taken, such as flight phase, Flight Management Function (FMF) value for cruise phase, Time Delay to True (TDT) enabled threshold, TEVC minimum and maximum envelope boundaries, etc. Additional memory is used to store input constants for the logic. The TEVC Logic includes 6 main output functions (in the 2nd column from the left of the figure) which are used to generate at least the four TEVC Outputs as the targeted, controlled surface positionings, i.e., In board Flap Target, Outboard Flap Target, Aileron Target, and Flaperon Target. Each of the 6 main TEVC output functions is described in further detail with respect to the following figures.

Figure 6C:
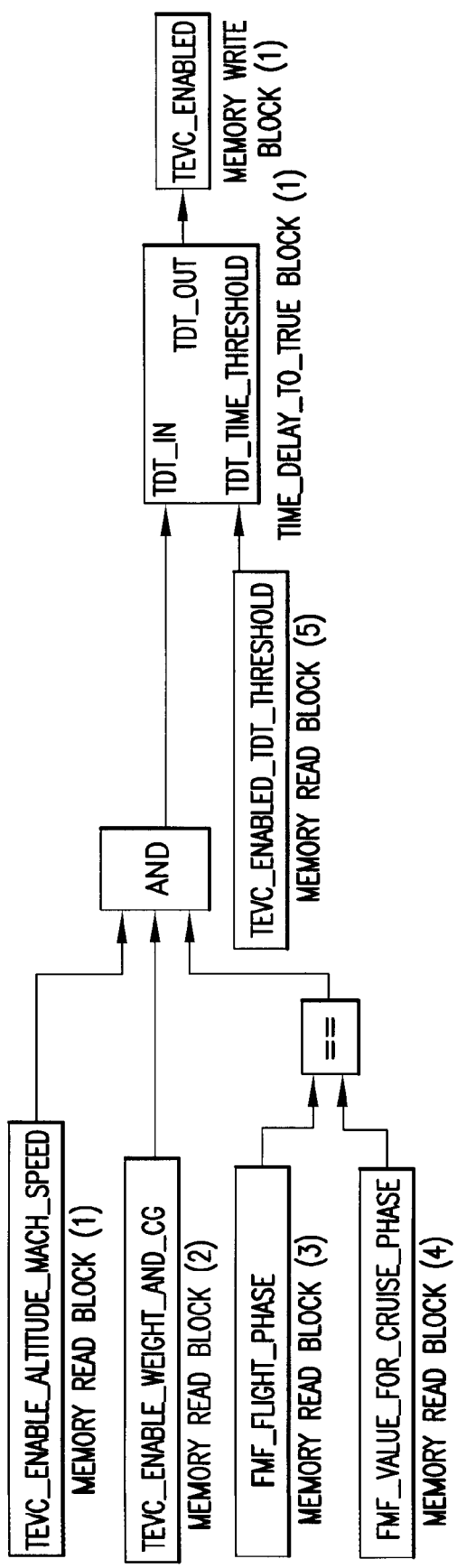
FIG. 6C shows an example of an Enable function.

FIG. 6C shows the TEVC_Enable function which computes an output TEVC_Enabled command signal based on the airplane altitude, Mach Number, weight, and CG values and the flight phase indicating a cruise state as indicated by the Flight Management Function (FMF). All the conditions need to be valid for a given amount of time (TEVC_enabled_TDT_threshold) before actually enabling TEVC. This is accomplished by using a Time_Delay_To_True block, which has the output as TRUE if the input is TRUE for an amount of time equal or exceeding the TEVC_enabled_TDT_threshold. When the input goes FALSE the output goes false immediately.

Figure 6D:
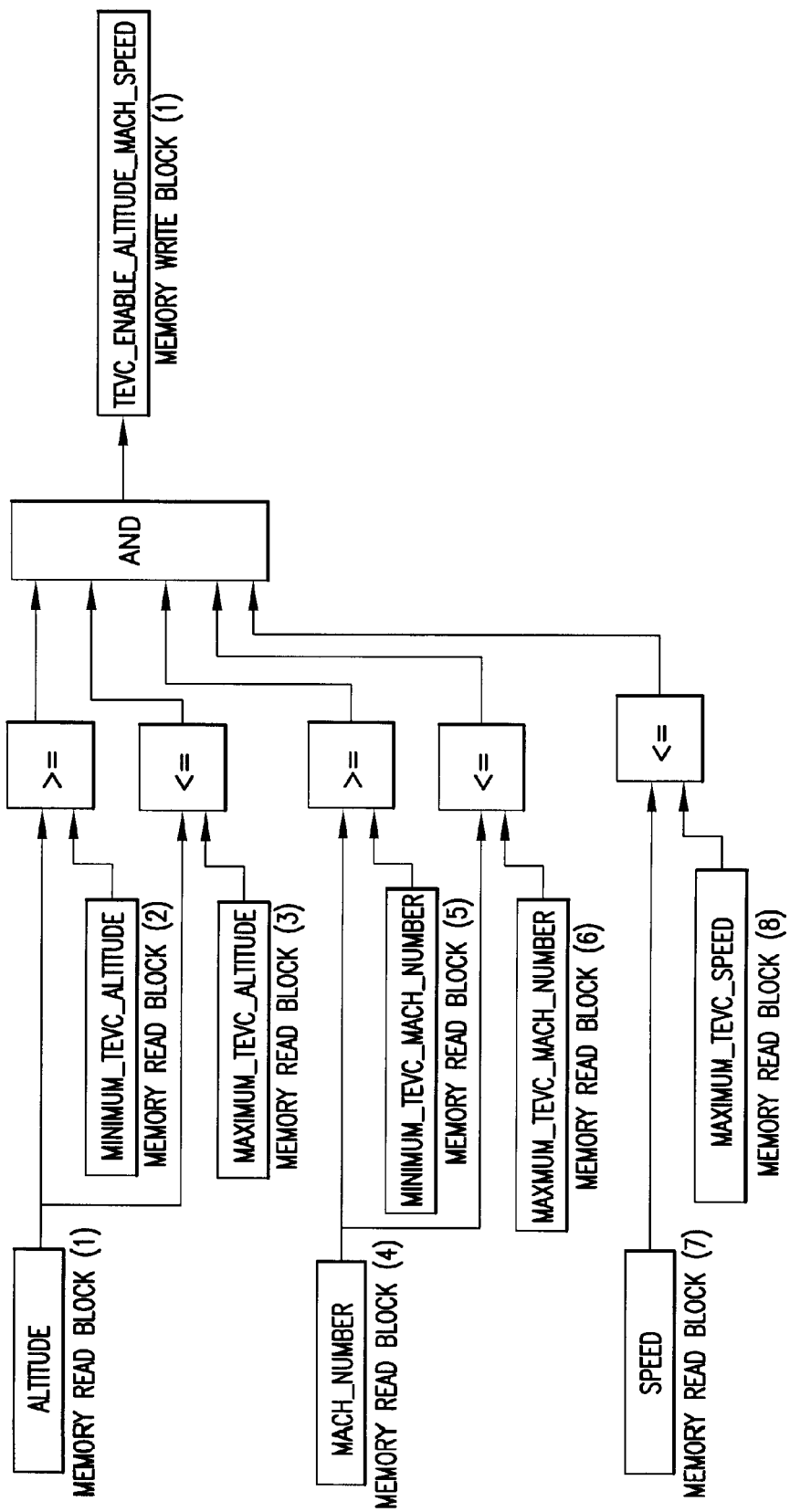
FIG. 6D shows an example of an Enable Flight Envelope function.

FIG. 6D shows the TEVC_Enable_Flight_Envelope function which implements a test indicating if the airplane is in the Variable Camber Envelope shown in FIG. 1. The output is TRUE if the condition is satisfied.

Figure 6E:
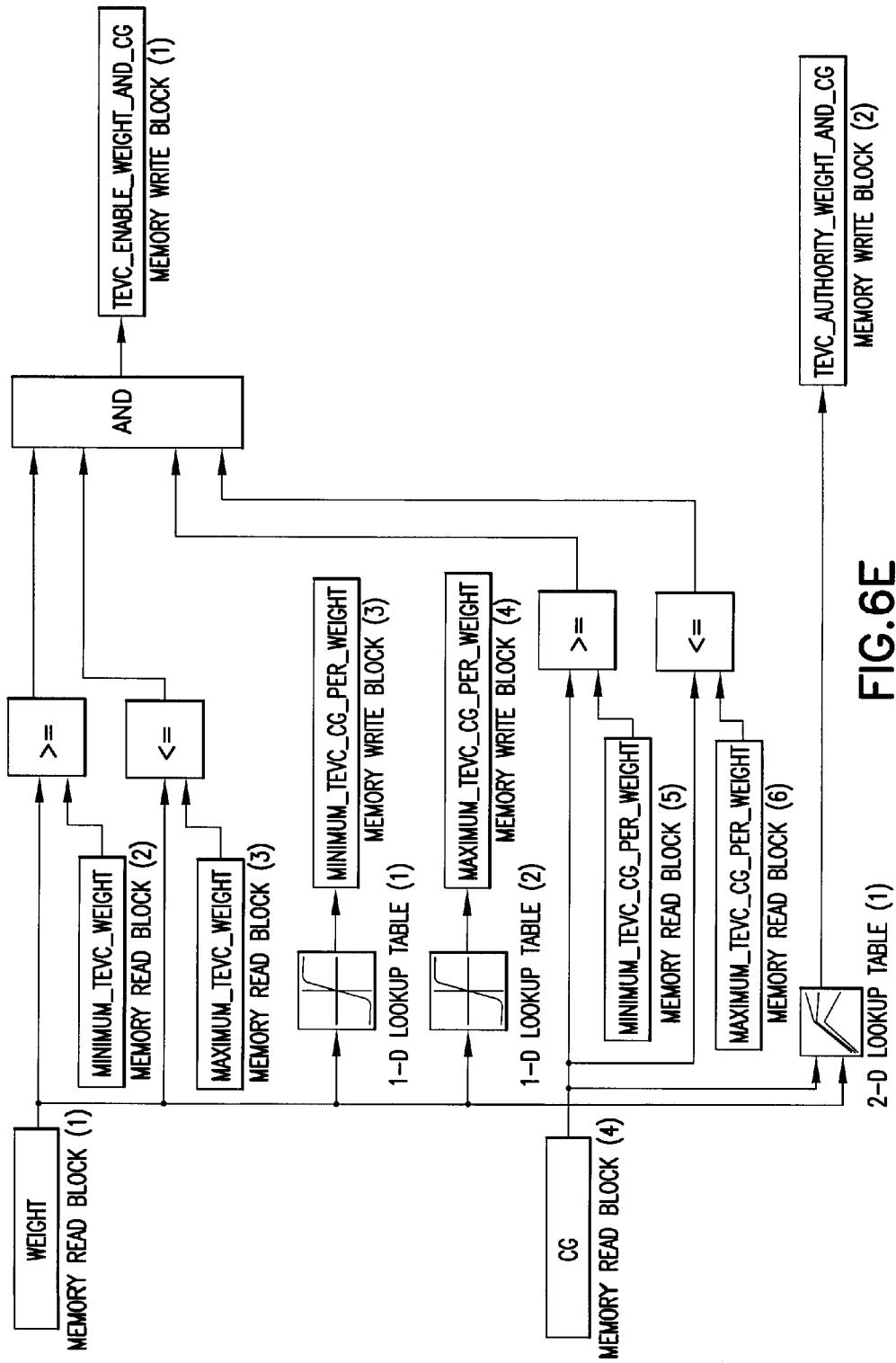
FIG. 6E shows an example of an Enable Weight CG function.

FIG. 6E shows the TEVC_Enable_Weight_CG function which produces two variables: (1) enabling dynamic adjustment of variable camber based on weight and CG criteria only; and (2) the authority factor of the VC commands based on the weight and CG criteria.

Figure 6F:
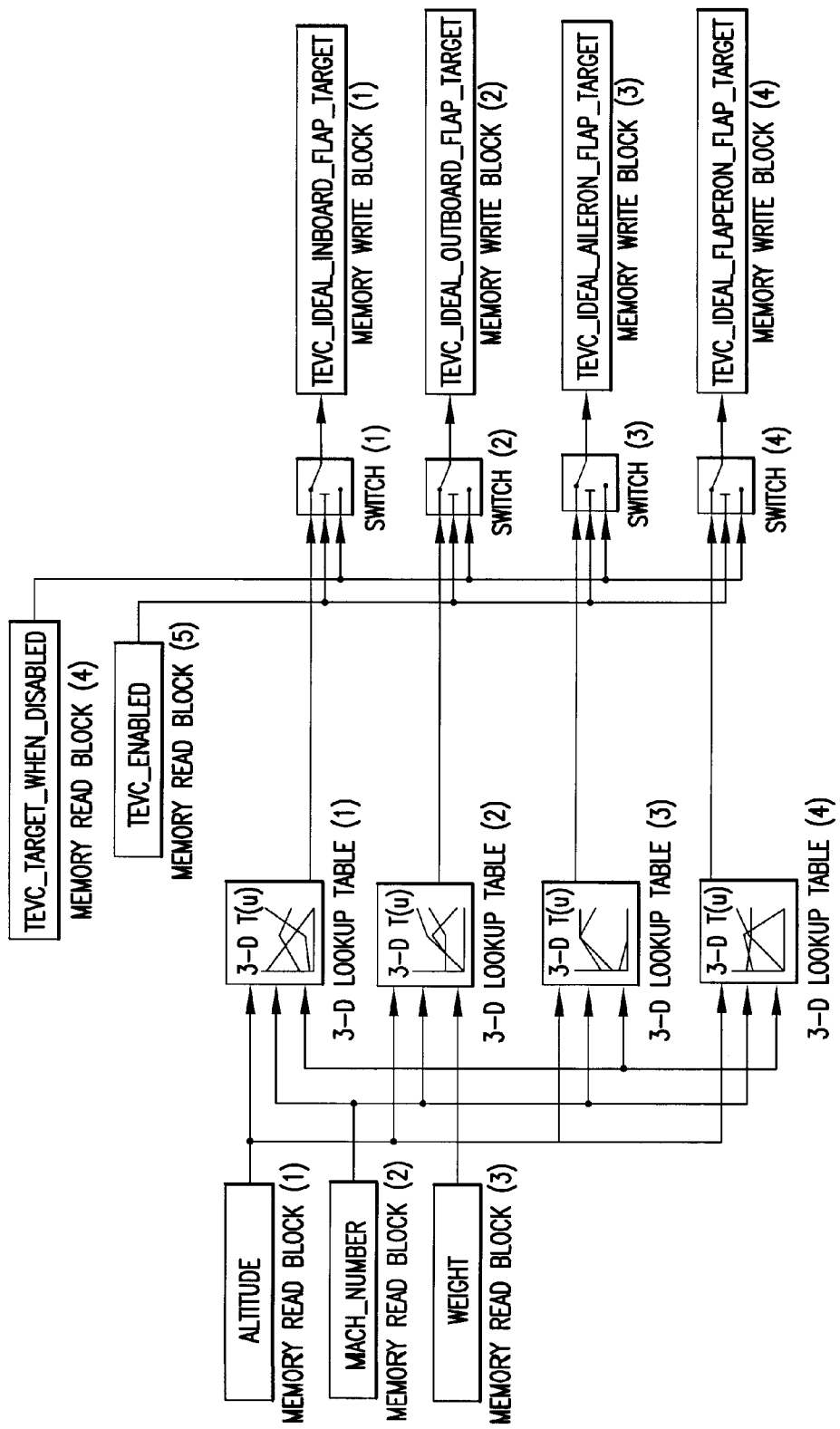
FIG. 6F shows an example of an Ideal Surface Targets function.

FIG. 6F shows the TEVC_Ideal_Surface_Targets function which computes the ideal command signals for the four controlled surfaces: (1) the inboard flaps; (2) the outboard flaps; (3) the ailerons; and (4) the flaperons. These are updated continuously based on the airplane input parameters for altitude, weight and Mach number. Separate data files (memory banks) are stored for each of the four commanded surfaces. 3D lookup tables are employed to find the ideal values for the four sets of controlled surfaces. If the TEVC function is not enabled, the command signals are switched to stored default values, which are commands to align the controlled surfaces to the reference design positions for an aligned wing TE.

Figure 6G:
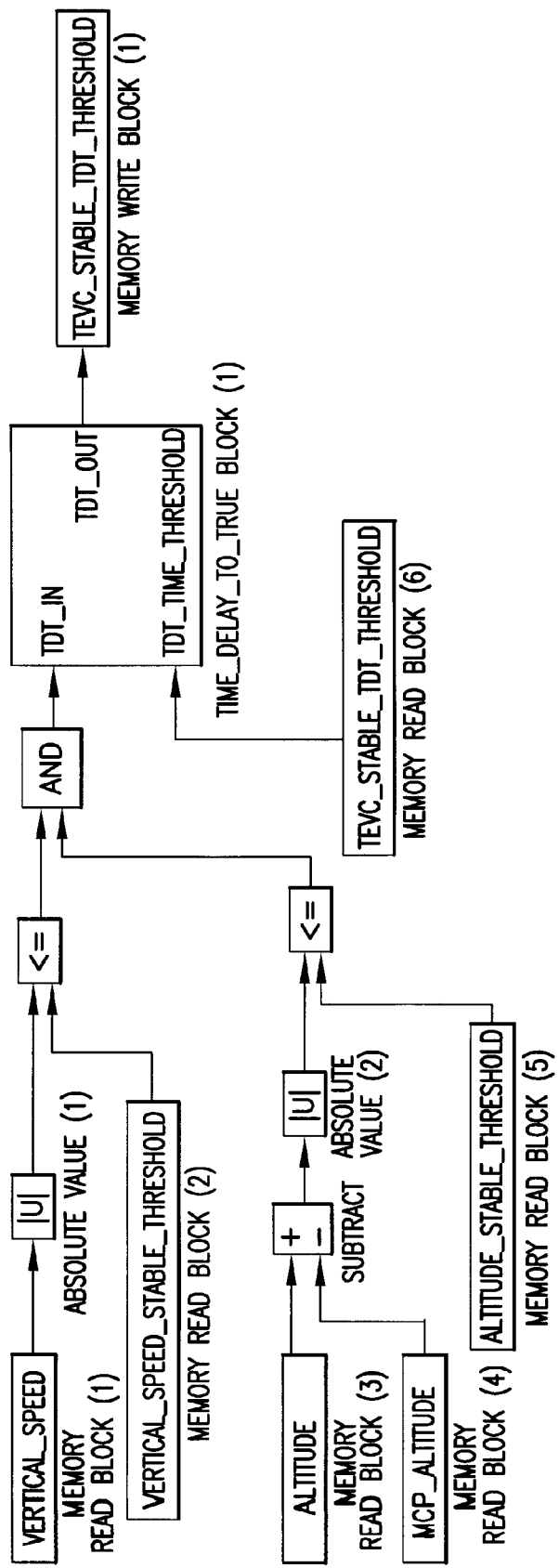
FIG. 6G shows an example of a Stable Flight Status function.

FIG. 6G shows the TEVC_Stable_Flight_Status function which determines if the airplane is in a stable flight state. This is done by two tests: (1) if the vertical speed of the airplane is less than some threshold; and (2) if the airplane altitude is within some threshold of the pilot dialed altitude in the Mode Control Panel (MCP). Both tests have to be valid for at least an amount of time equal to TEVC_stable_TDT_threshold before the parameter TEVC_stable_flight_test turns to TRUE.

Figure 6H:
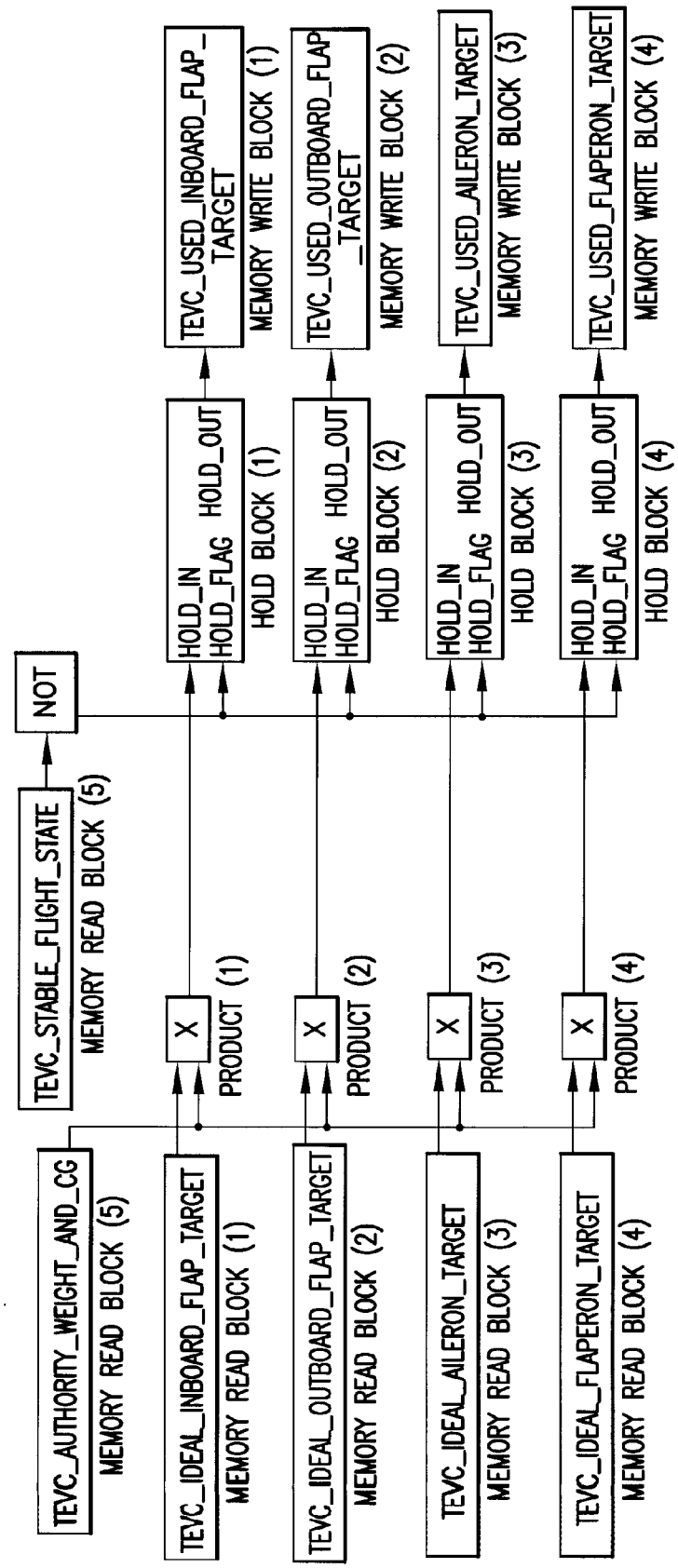
FIG. 6H shows an example of a Used Surface Targets function of the trailing edge variable camber control logic.

FIG. 6H shows the TEVC_Used_Surface_Targets function which has multiple stages. It reduces the ideal commands from those based on instantaneous flight conditions so that designed load factor threshold are not exceeded for some weight and CG combinations. The variable TEVC_authority_weight_and_CG has a value between 0 and 1. It does not change the command sent to the actuation system when the plane is within the operating VC envelope (see FIG. 1) but a stable flight condition is not detected, like increased vertical speeds or altitude not at target altitude.

All of the signal processes in the figures are permanently re-computed by the on-board computer. The airplane sensors used to sense the aircraft conditions are not shown. Some of the inputs to the basic implementation are estimated by standard control laws and reused. The Actuation System for carrying out the surfaces targets is depicted at a high level in FIG. 4, and is not shown in further detail herein.

The dynamic adjustment for optimized variable camber allows for many benefits to be accomplished (depending on the way TEVC system is implemented). The calculated and dynamically controlled repositioning of some or all of the wing's trailing edge surfaces results in continual optimization of the lift-to-drag ratios for the wing. The more aerodynamically efficient wing camber adjustments can reap a benefit of as much as 2-5% reduction of airplane drag. It can reduce fuel consumption for the same mission range at the same average speed, increase the airplane payload for the same fuel consumption for the same mission distance, and/or increase mission distance for the same payload and fuel consumption. Tradeoffs among these benefits to attain desired mission goals such as payload, fuel consumption, speed and range can be readily formulated. Additional potential benefits include increased buffet margin and high lift span-load tuning. The trailing-edge repositioning is automatic, so it requires no added pilot or ground crew work. It also facilitates further development of adaptive wing control systems that can learn optimum control surfaces repositioning over time.

TEVC Implementation with Surface Coordination

As an improvement to the basic implementation, some of the commanded surfaces targets could be computed both on the already used airplane parameters and the achieved positions of other surfaces to provide additional advantage. The flaps are usually designed for a limited amount of actuation budgets. Increasing the number and the distance the flaps have to travel for the life of the airplane increases cost and/or weight. Surfaces such as ailerons and flaperons have greater tolerances for repositioning operations as compared to the flaps. As a result, in the version provided with surface coordination, the ailerons and flaperons commanded positions are computed while using the existing positions of the flaps, so that they are commanded continuously.

Figure 7B:
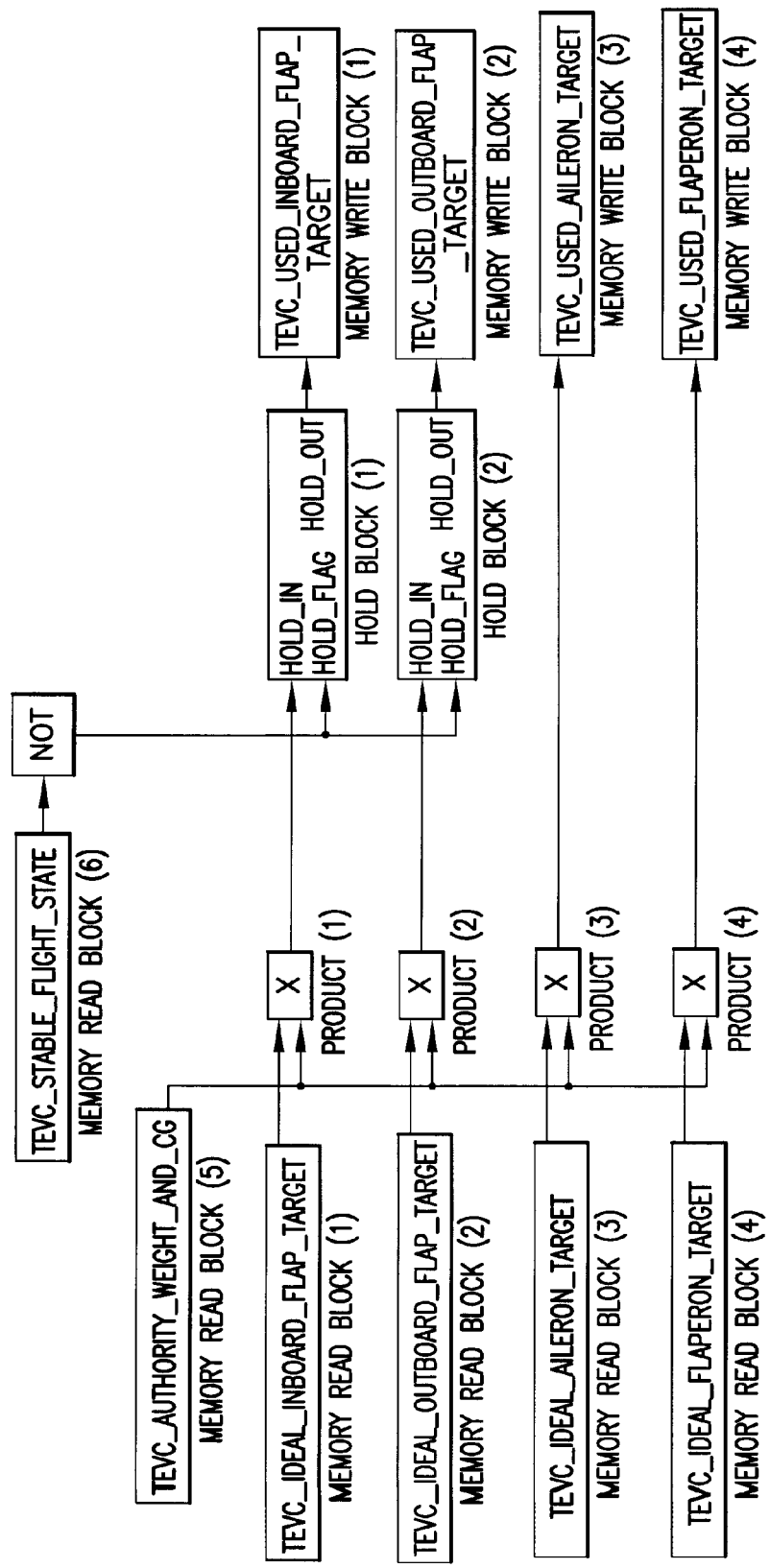
FIG. 7B shows the back end of its Used Surface Target function.

FIG. 7A shows the TEVC_Used_Surface_Targets function for the version provided with surface coordination. The hold blocks associated with the aileron and the flaperon in the basic implementation are not used here. The blocks that are changed or new in this version are shown in gray background. FIG. 7B shows the logic to process the Ideal Targets to Used Targets, similar to the one shown in FIG. 6H for the basic implementation.

TEVC Implementation with Prediction Function

Another variation of the basic TEVC implementation is to add a prediction function for aircraft weight. The TEVC computed optimum TE surface positions depend on the weight. The weight decreases as the airplane flies and fuel is consumed. Actuation systems that allow repositioning of the controlled surfaces in small increments are costly and/or weight expensive. Driving away from the target with repositioning back at a slightly modified position is expensive from an actuation fatigue point. Therefore, employing a weight decrease prediction function provides the benefit that commanding the surfaces as if the weight is smaller than at the commanded time minimizes the error between the ideal and the real flap position.

Referring again to FIG. 5, the following explains how this benefit is achieved. Due to the weight decrease, the ideal position for one of the commanded surfaces (shown in solid line) will decrease due to variation based on weight. The dashed line would represent the behavior of the basic implementation where surfaces such as flaps are commanded to move once the gap between the ideal position and the real position opens enough, e.g., for a system subject to actuation budget constrains. When the command is given, the real position is commanded to the ideal target as computed at that point in time. The dotted line shows the improvement in this version when commanded to move the surface to an anticipated ideal target. As a result, the average error between the real and the ideal surface positions is decreased, and in addition the fuel benefit is increased also because the L/D varies nonlinearly with the surface position error from ideal.

Figure 8A:
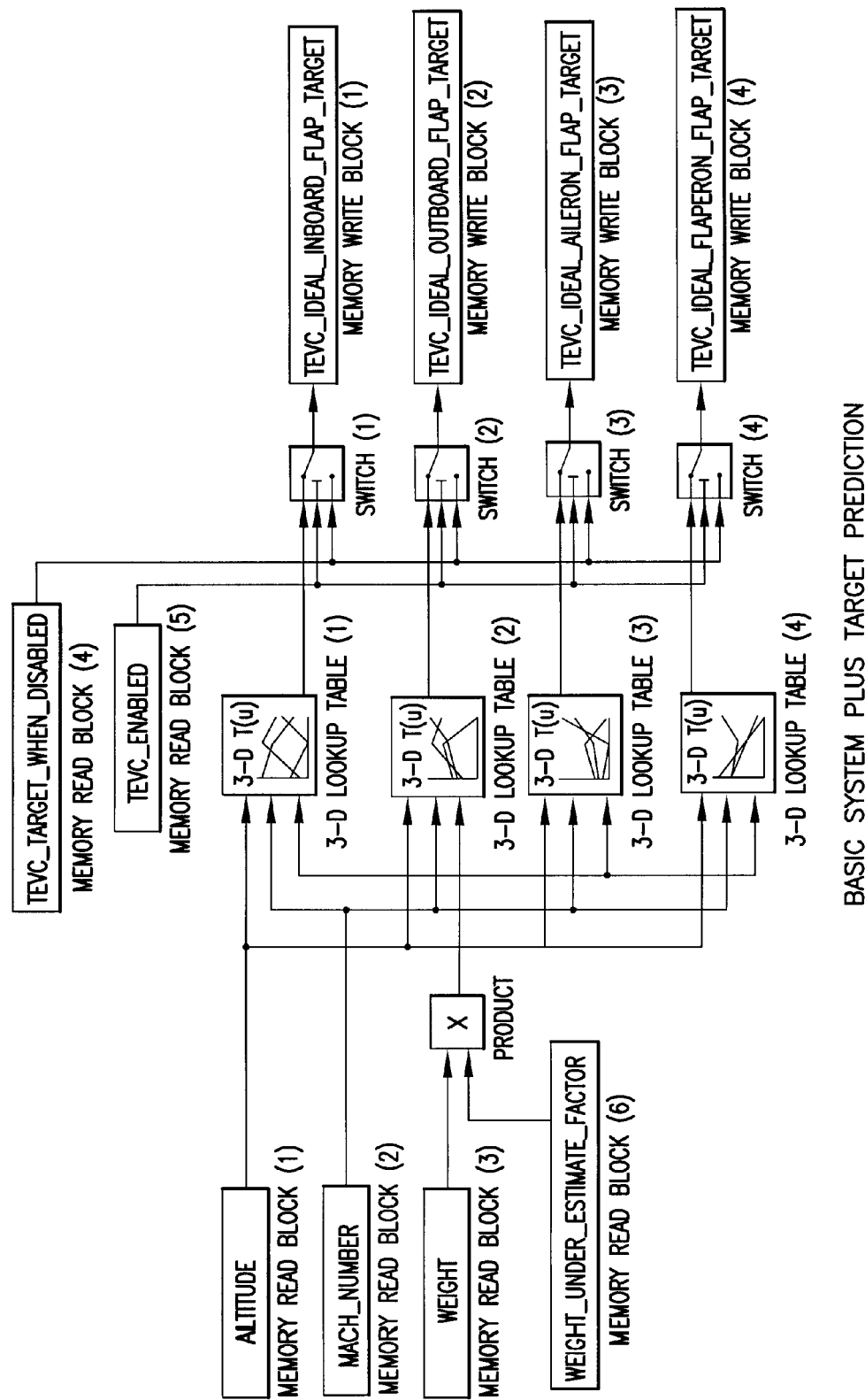
FIG. 8A is a schematic diagram showing a basic trailing edge variable camber control system with target controlled surface prediction.

FIG. 8A shows the TEVC_Ideal Surface_Targets function for the version provided with weight prediction. The blocks that are new are shown in gray background. The previous weight data is multiplied by a downsizing factor and used in the TEVC_Ideal_Surface_Targets function. Other variations may be easily imagined and implemented by those skilled in the art, e.g., using prediction based on the observed fuel/weight decrease rate for that plane and flight to set the coefficient Weight_Under_Estimate_Factor.

TEVC Implementation with Adaptation (Self-Learning) Function

Another variation of the basic TEVC implementation is to add an adaptation or self-learning function. Each airplane is assembled slightly different but within manufacturing tolerances, e.g., angle of wing to body assembly, body curvature, etc. Airplane and wing characteristics also will vary over the life of the airplane. As a result, the ideal targets for the commanded surfaces can vary over time, and differ from airplane to airplane. In this variation, advantage is obtained for each airplane by learning from prior airplane history.

FIG. 9A shows the TEVC_Ideal_Surface_Targets function for the version provided with an adaptation or self-learning function. The controlled surfaces lookup tables in FIG. 6F are replaced by Adaptation Blocks which receive data from memory reflecting the actual histories of the controlled surfaces, as shown in gray. FIG. 9B shows details of an example of the TEVC_Adaptation_Block, in which 3-D lookup tables output memory location addresses to store two things: (1) the value for the ideal surface target; and (2) the value of the optimized criterion, the fuel consumption, for the particular altitude, Mach number and weight condition. The stored value for the ideal target is output if the stored fuel consumption for the flight condition is less or equal to the present fuel consumption. If the present fuel consumption is less than the stored fuel consumption for the flight configuration, then two things happen via the switches depicted in the figure: (1) the ideal surface target position for the present flight conditions is overwritten with the present surface position; and (2) the fuel consumption for the present flight conditions is overwritten with the present fuel consumption.

It is understood that many modifications and variations may be devised given the above description of the principles of the invention. It is also implied that all control logic described here in application to trailing edge variable camber applies to leading edge variable camber and/or to a combination of leading and trailing edge variable camber. It is intended that all such modifications and variations be considered as within the spirit and scope of this invention, as defined in the following claims.

We claim:

1. A dynamic adjustment control module used in an aircraft for enabling repositioning of movable surfaces of a wing of the aircraft during a given flight phase in order to optimize wing camber for optimum lift/drag ratios, comprising:

a variable camber control logic implemented as software running on an onboard computer for operating a computerized aircraft flight control system, wherein said variable camber control logic is configured to perform a predictive wing surface evaluation and adjustment by:
determining an interval time, determining an approximately optimal wing surface position for a future time within said interval time, in response to inputs indicating actual flight conditions of the aircraft, and transmitting command signals to the aircraft flight control system for repositioning the movable surfaces of the wing to said approximately optimal wing surface position.

2. A dynamic adjustment control module according to claim 1, wherein the variable camber control logic is enabled for operation during a cruise phase of the aircraft's flight.

3. A dynamic adjustment control module according to claim 2, wherein the variable camber control logic utilizes inputs for at least altitude, speed, and Mach number for actual flight conditions of the aircraft.

4. A dynamic adjustment control module according to claim 3, wherein the variable camber control logic computes optimum positions for the inboard flaps, outboard flaps, ailerons and flaperons of the wing.

5. A dynamic adjustment control module according to claim 3, wherein the variable camber control logic also utilizes inputs for weight and center-of-gravity of the aircraft.

6. A dynamic adjustment control module according to claim 3, wherein the variable camber control logic also utilizes inputs for vertical speed and pilot setting of Mode Control Panel altitude of the aircraft.

7. A dynamic adjustment control module according to claim 2, wherein the variable camber control logic computes optimum positions for the movable surfaces of the wing at approximately half-hour intervals during a cruise flight phase of several hours duration.

8. A dynamic adjustment control module according to claim 1, wherein the variable camber control logic is enabled to output optimum positions for the movable surfaces only if the actual flight conditions are detected to be in effect for a given amount of time as an enablement time threshold.

9. A dynamic adjustment control module according to claim 1, wherein the variable camber control logic includes a surface coordination function in which optimum positions for the ailerons and flaperons are computed while using existing positions for the flaps, in order to reduce the repositioning load on the flaps while taking advantage of greater repositioning tolerance of the ailerons and flaperons.

10. A dynamic adjustment control module according to claim 1, wherein the variable camber control logic includes a prediction function for aircraft weight in which the optimum positions for the movable surfaces are computed with a predicted weight later in time than the interval time in order to avoid the need for repositioning of the movable surfaces at the later time.

11. A dynamic adjustment control module according to claim 1, wherein the variable camber control logic includes a learning function in which aircraft and wing characteristics that vary over the life of the aircraft are stored and utilized as inputs in computing optimum positions for the movable surfaces.

12. A dynamic adjustment control module according to claim 1, wherein the variable camber control logic is further configured to:
determine a stored fuel consumption value;
determine a current fuel consumption value;
compare the current fuel consumption value to the stored fuel consumption value; and
actuate the wing surfaces to a stored position if the stored fuel consumption is lower than the current fuel consumption, or store the current wing surface positions if the current fuel consumption is lower than the stored fuel consumption.

13. A dynamic adjustment control module according to claim 1, wherein the variable camber control logic is further configured to:
determine an optimal wing surface position for a future time within said interval time based on an inputted current flight path.

14. A computer configured to perform a predictive wing surface evaluation and adjustment for a wing of an aircraft by performing the following steps:
determining an interval time,
determining an approximately optimal wing surface position for the wing for a future time within said interval time, in response to inputs indicating current flight conditions of the aircraft, and
transmitting command signals to an aircraft flight control system for repositioning movable surfaces of the wing to said approximately optimal wing surface position.

15. A computer memory according to claim 14, further configured to cause the one or more processors to perform the following steps:
determine a stored fuel consumption value;
determine a current fuel consumption value;
compare the current fuel consumption value to the stored fuel consumption value; and
actuate the wing surfaces to a stored position if the stored fuel consumption is lower than the current fuel consumption, or store the current wing surface positions if the current fuel consumption is lower than the stored fuel consumption.

16. A dynamic adjustment control module according to claim 14, further configured to cause the one or more processors to perform the following steps:
determine an optimal wing surface position for a future time within said interval time based on an inputted current flight path.

17. A computer implemented method for performing a predictive wing surface evaluation and adjustment for a wing of an aircraft by performing the following steps:
determining an interval time,
determining an approximately optimal wing surface position for the wing for a future time within said interval time, in response to inputs indicating current flight conditions of the aircraft, and
transmitting command signals to an aircraft flight control system for repositioning movable surfaces of the wing to said approximately optimal wing surface position.

18. A computer implemented method according to claim 17, further comprising:
determining a stored fuel consumption value;
determining a current fuel consumption value;
comparing the current fuel consumption value to the stored fuel consumption value; and
actuating the wing surfaces to a stored position if the stored fuel consumption is lower than the current fuel consumption, or store the current wing surface positions if the current fuel consumption is lower than the stored fuel consumption.

19. A computer implemented method according to claim 17, further comprising:
determining an optimal wing surface position for a future time within said interval time based on an inputted current flight path.

* * * * *